United States Patent [19]

Theis

[11] Patent Number: 5,642,411
[45] Date of Patent: Jun. 24, 1997

[54] ANTICIPATORY CALL DISTRIBUTOR

[75] Inventor: Peter F. Theis, McHenry, Ill.

[73] Assignee: Illinois Technology Transfer LLC, Gurnee, Ill.

[21] Appl. No.: 232,630

[22] Filed: Apr. 25, 1994

[51] Int. Cl.$^6$ ...................................................... H04M 3/22
[52] U.S. Cl. ........................... 379/266; 379/112; 379/265; 379/309
[58] Field of Search ....................................... 379/265, 266, 379/93, 84, 34, 71, 89, 201, 202, 207, 211, 309, 212, 221, 142, 210, 67, 88, 112, 214, 230, 215, 216

[56] References Cited

U.S. PATENT DOCUMENTS

| 4,328,396 | 5/1982 | Theis | 379/71 |
|---|---|---|---|
| 4,694,483 | 9/1987 | Cheung | 379/34 |
| 4,788,715 | 11/1988 | Lee | 379/266 |
| 4,800,583 | 1/1989 | Theis | 379/84 |
| 4,881,261 | 11/1989 | Oliphant et al. | 379/266 |
| 5,023,868 | 6/1991 | Davidson et al. | 379/93 |
| 5,029,199 | 7/1991 | Jones et al. | 379/89 |
| 5,291,552 | 3/1994 | Kerrigan et al. | 379/220 |
| 5,299,260 | 3/1994 | Shaio | 379/265 |

OTHER PUBLICATIONS

In Focus; *New Technologies that Facilitate Integrated Inbound/Outbound Marketing*; Charles E. Day, Charles E. Day and Associates; Telemarketing, May 1994; (pp. 75–76, 78 & 80).
ASPECT; *Applications Guide Intelligent Call Processing Intelligent Interflow*; (pp. 1–15).
ASPECT; *Applications Guide Conditional Routing*; Mar. 1991; (pp. 1–8).
Toshiba America Information Systems, Inc.; *Perception e & ex ACD/MIS General Description*; 1992, Issue 2; (pp. 1–13).
Computers and Communications; NEAX 2400 Information Management System; *ACD/MIS Fully Integrated System for Total Call Handling Control*; (8 pp.).
Northern Telecom; *ACD–MAX Automatic Call Distribution*; (2 pp.).
Aspect Telecommunications; *The Aspect Call Center Custom Report Software*; Sep. 1989; (2 pp.).
Aspect Telecommunications; *The Aspect Solution*; Jan. 1991; (2 pp.).
Aspect Telecommunications; *The Aspect Call Center Management Reporting*; Jan. 1990; (6 pp.).

*Primary Examiner*—Krista M. Zele
*Assistant Examiner*—Scott Wolinsky
*Attorney, Agent, or Firm*—Conley, Rose & Tayon, PC; Michael F. Heim

[57] ABSTRACT

A communications distribution system is disclosed for facilitating the handling of telephone calls within a plurality of groups. Each of the groups includes a line group and a channel group interconnected by an anticipatory call distributor (ANCD) for determining the availability of channels for connecting to a line from the associated line group, and for reassigning channels to other groups as long as a certain minimum capacity is maintained in each group. The ANCD also anticipates whether any channels are expected to become available within a predetermined period. In response to channel availability, or to a channel that is expected to become available, a priority and availability logic sets an appropriate status register, which is checked by switching command logic. The switching command logic periodically checks the status of the bits in the status register and determines, based upon a priority ranking, whether any channel is available or will become available to answer a phone call, and if so, which channel will be used.

59 Claims, 11 Drawing Sheets

*FIG. 4A*
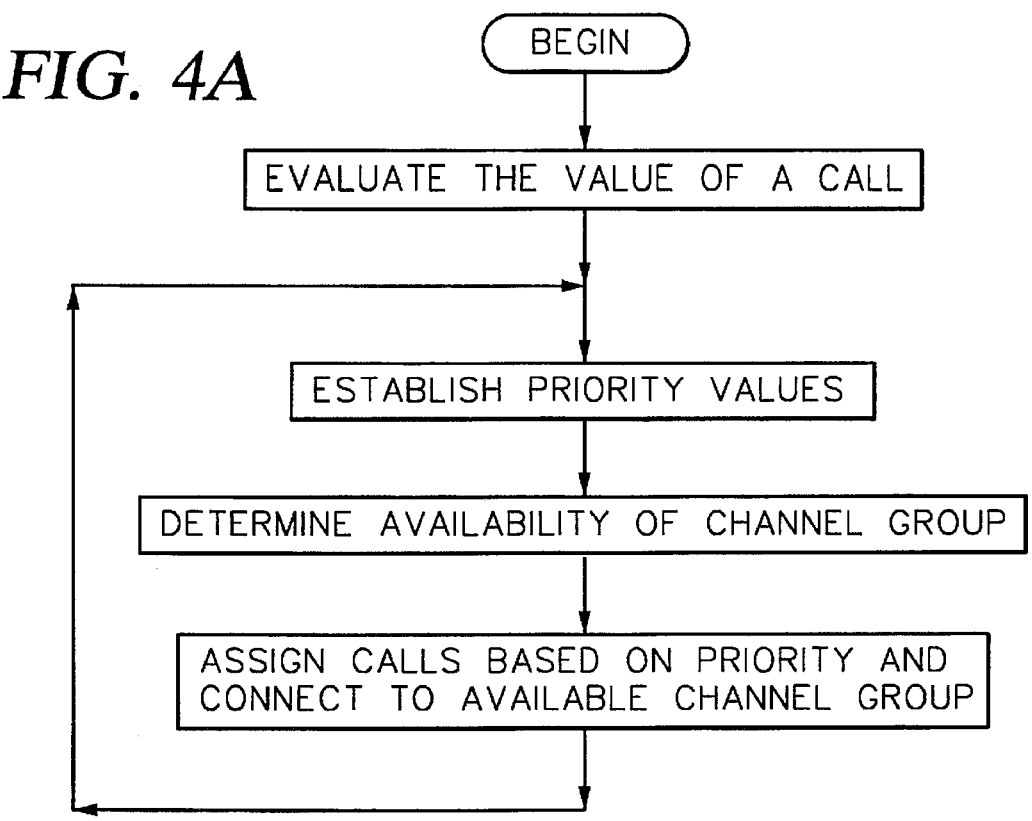
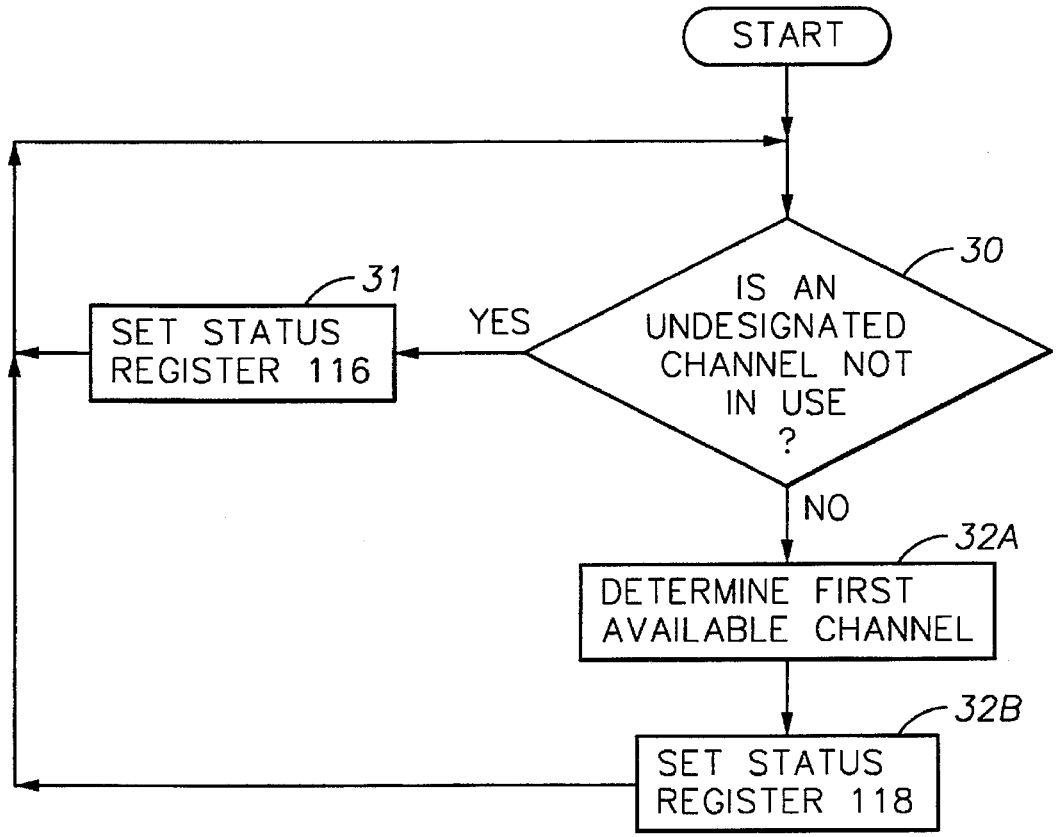
*FIG. 4F*

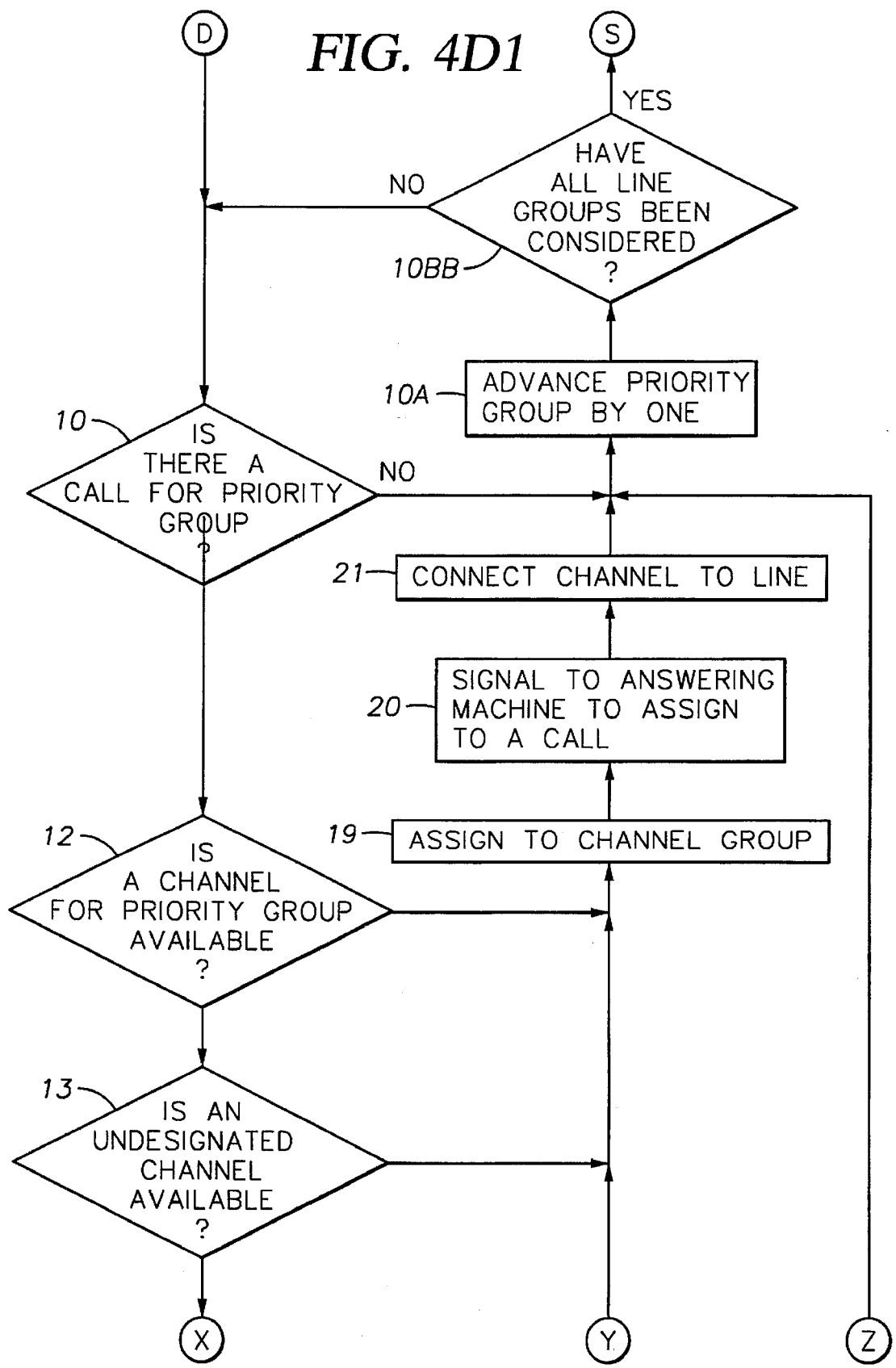
FIG. 4D1

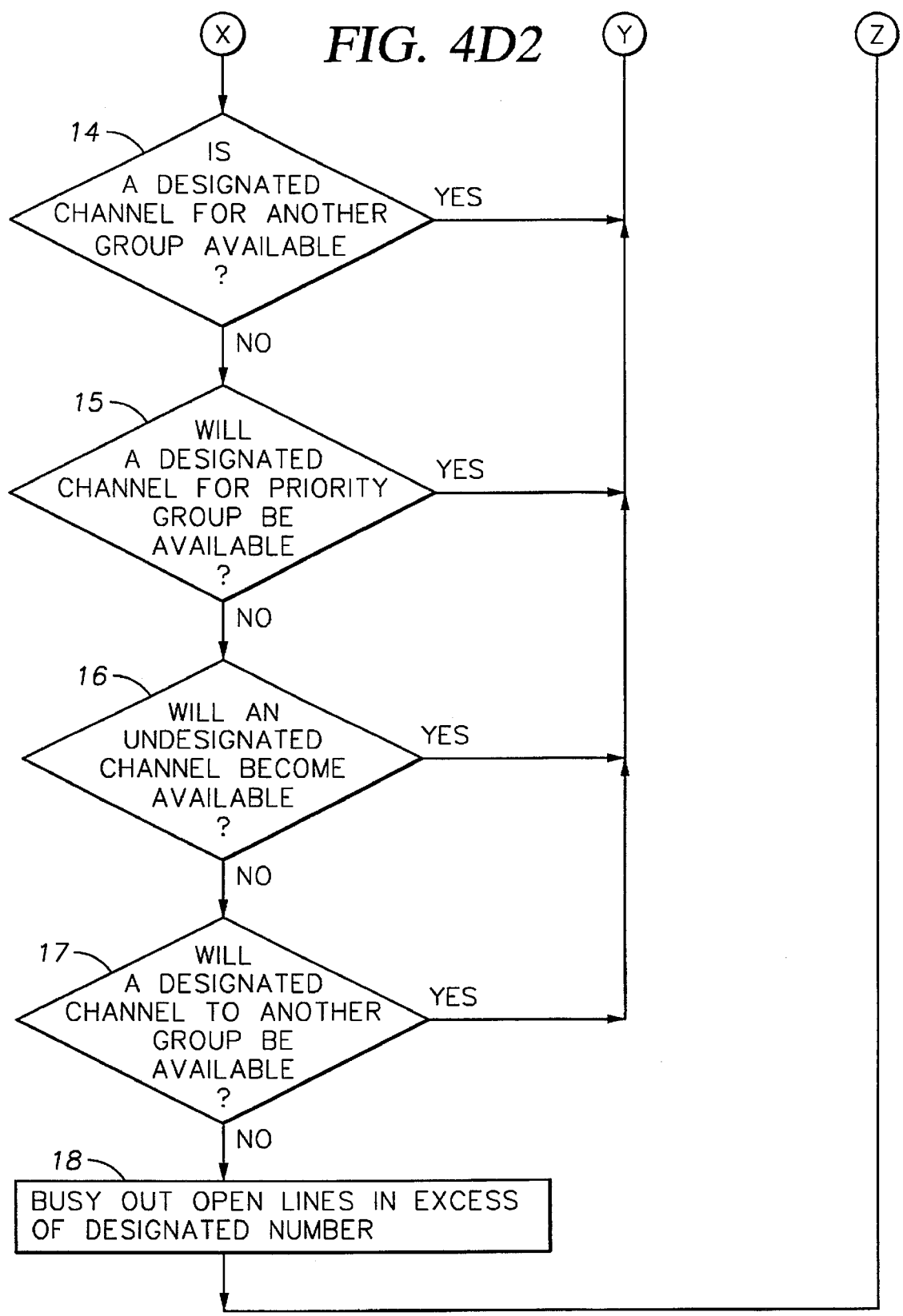

CHANNEL AVAILABILITY LOOKUP TABLE

| CHANNEL | GROUP DESIGNATION | GROUP ASSIGN | CALL LENGTH/ CALL | MAXIMUM DELAY | PREDETERMINE DELAY |
|---|---|---|---|---|---|
| 1 | A | A | 60 SECONDS | 30 | 5 |
| 2 | A | A | 60 SECONDS | 30 | 13 |
| 3 | A | C | 120 SECONDS | 30 | −24 |
| 4 | UNASSIGNED | B | 120 SECONDS | 30 | 16 |
| 5 | UNASSIGNED | B | 120 SECONDS | 30 | — |
| 6 | UNASSIGNED | B | 120 SECONDS | 30 | — |
| 7 | B | B | 120 SECONDS | 30 | — |
| 8 | B | B | 120 SECONDS | 30 | 23 |
| 9 | C | C | 180 SECONDS | 30 | −6 |
| 10 | C | C | 180 SECONDS | 30 | 4 |
| 11 | C | C | 180 SECONDS | 30 | |

*FIG. 5*

ANTICIPATORY CALL DISTRIBUTOR

BACKGROUND OF THE INVENTION

The present invention relates generally to a system for connecting incoming telephone lines to a telephone answering bank. More particularly, the present invention relates to a system for automatically and efficiently distributing telephone lines to a plurality of operators or one or more automated devices, such as answering machines, voice mail or audiotex systems. Still more particularity, the present invention relates to a control system for assigning operators and/or such devices from a plurality of groups to various telephone lines using historical answering times and/or other criteria to predict operator and/or device availability.

In certain industries, such as merchandise sales, reservation centers, answering services and the like, the ability to effectively handle a large quantity of telephone calls often is the difference between business success and failure. To accommodate customers, typically a large number of telephone lines (or simply "lines") is provided to reduce the number of busy signals and/or the period during which the customer is required to "hold" before their telephone call is answered. The longer that customers are required to wait to have calls answered, the more likely is the probability that customers will hang up before the call is answered. Telephone calls which go unanswered generally correlate to a loss of business. At the same time, it may be prohibitively expensive to hire an operator, or buy a device for each telephone line, especially during periods where all of the telephone lines are not in use.

In an attempt to alleviate this problem, devices have been developed to generally allocate x number of operators or an answering machine to y number of telephone lines, so that a number x of operators or devices can handle a given number y of telephone lines. The term "channel" is used herein to refer generically to any one of the following: an operator, an answering machine, an automated telephone announcement device, an automated telephone answering and recording device, or other similar devices for responding to or recording communications from a call. One such device is commonly referred to as an Automatic Call Distributor ("ACD"), which allocates channels to lines based upon the general principle that the first channel available will be assigned to the line that has waited the longest to be answered. As shown in FIG. 1, this type of prior art ACD unit generally includes a plurality of telephone lines y connected to the ACD unit, which in turn connects to a plurality of channels x. As one skilled in the art will understand, the switching bus typically includes telephone line interface units and isolation circuitry between the ACD and telephone lines. The line interface unit (not shown) detects incoming telephone calls, disconnect signals, and functions to connect an audio or digital path between the telephone line and switching bus.

In these prior art systems, the ACD unit interconnects the telephone lines to the channels through a switching bus, based upon (1) the length of time that the line has been unanswered, and (2) channel availability. Alternatively, some ACD's allocate channels in a manner to ensure that each channel receives an equal number of telephone calls. As shown in FIG. 1, in these type of prior art systems, it is necessary to provide a plurality of independent ACD units to handle multiple channels and lines.

More sophisticated ACD's have been developed that support multiple groups of lines and multiple groups of channels, as generally shown for purposes of illustration in FIG. 2. In these systems, a particular group of lines is assigned to a particular group of channels, with an ACD unit interconnecting the lines and channels. Thus, as shown in FIG. 2, line group A generally is answered by channel group A. If, however, a particular channel group is fully occupied, calls may overflow into another channel group, such as channel group B or channel group C. An ACD controller is provided to monitor channel availability and to direct phone calls between channels as necessary to minimize delays.

Although these prior art ACD systems do minimize delays in answering phone calls, they are not without certain inherent limitations. One particular limitation is that the time value of a call and the period required to answer a call are not considered when redirecting phone calls between channels. For example, if line group A has telephone calls that require five minutes to handle, and these calls are designated as the highest priority so as to take precedence over other calls, they can displace phone calls on another channel group (channel B, for example) which may only require thirty seconds to process. Each call that overflows from line group A therefore potentially preempts ten calls from line group 2. None of the prior art systems recognize this anomaly in their system design, much less provide a viable solution.

Moreover, all of the current ACD systems operate by only looking at current channel availability. There is no system currently available that considers anticipated channel availability real-time, based upon historical answering times for the various groups of lines and/or other parameters indicating future channel availability.

In addition, the prior art systems do not automatically react to anticipated call volume. A call on line group A could overflow to channel group B, where an available channel is located, without regard to the possibility that this channel will be required momentarily by a call on line group 2. In addition, if activity is extremely heavy on line group 1, as may occur during a very heavy peak period, the overflow from line group 1 could occupy a majority of the channels in channel groups B and C, thus adversely affecting the ability to process calls appearing on line groups B and C. The prior art ACD units have no way to automatically guarantee an automatically variable minimum number of channels to each group of lines to insure certain minimum service capacity within each group and still make the group available to handle overflow from other groups.

SUMMARY OF THE INVENTION

The present invention solves the shortcomings and deficiencies of the prior art by constructing a system for providing automatic distribution of telephone calls among various groups by anticipating channel availability based upon historical answering times and/or other criteria. The system includes an anticipatory call distributor ("ANCD") located intermediate each line group and channel group.

The anticipatory call distributor includes switching command logic and priority/availability logic (also referred to as "priority logic" or "priority and availability logic") for connecting calls from the various line groups to the most appropriate channel group based upon channel availability both currently and in the immediate future.

The ANCD also continuously assigns a weight factor to the incoming calls based upon predetermined priorities and upon the number of calls being handled outside of an associated channel group. The ANCD also blocks a dynamically determined minimum number of channels in each channel group to insure that each line group has at least a minimum number of channels to handle incoming calls.

The priority/availability logic monitors the activity of the channels and provides status information, such as bits or flags, in an associated status register to indicate channel availability. The switching logic checks the status of these bits and switches incoming phone calls to the appropriate channel based on the status registers and certain information entered into a lookup table. The lookup table is continuously updated by the control and logic processor to indicate current channel assignments, time per call, maximum allowable delays, and anticipated time until a channel becomes available.

These and other characteristics and advantages of the present invention will become readily apparent to those skilled in the art upon reading the following detailed description and claims and by referring to the accompanying drawings.

BRIEF DESCRIPTION OF THE DRAWINGS

For a more detailed description of the preferred embodiment of the present invention, reference will now be made to the accompanying drawings, wherein:

FIGS. 4A–4F comprise a flowchart illustrating the preferred operation of the control and logic processor of FIG. 3;

FIG. 5 illustrates a status lookup table preferably included as part of the ANCD system of FIG. 3;

DETAILED DESCRIPTION OF THE PREFERRED EMBODIMENT

In the following description, specific details are set forth, in order to facilitate a complete understanding of the present invention. It will be apparent, however, to one skilled in the art that these specific details need not be employed to practice the present invention. As such, departures may be made from the preferred embodiment while practicing the principles of the present invention. In other instances, well-known processing steps and device configurations are not described in detail in order not to obscure the present invention with a recitation of well known information. In addition, while the present invention is described for use with a telephone system, it should be understood that the invention is not so limited and can be used with any communication system. The term "channel" includes any type of device or human operator capable of responding to or recording communication signals. Each channel in a group may comprise a different medium. Thus, channel 1 may comprise a human operator while channel 2 may comprise an automated answering machine. Similarly, the term "line" refers to any communication line capable of transmitting analog or encoded voice communication signals.

Figure 1:
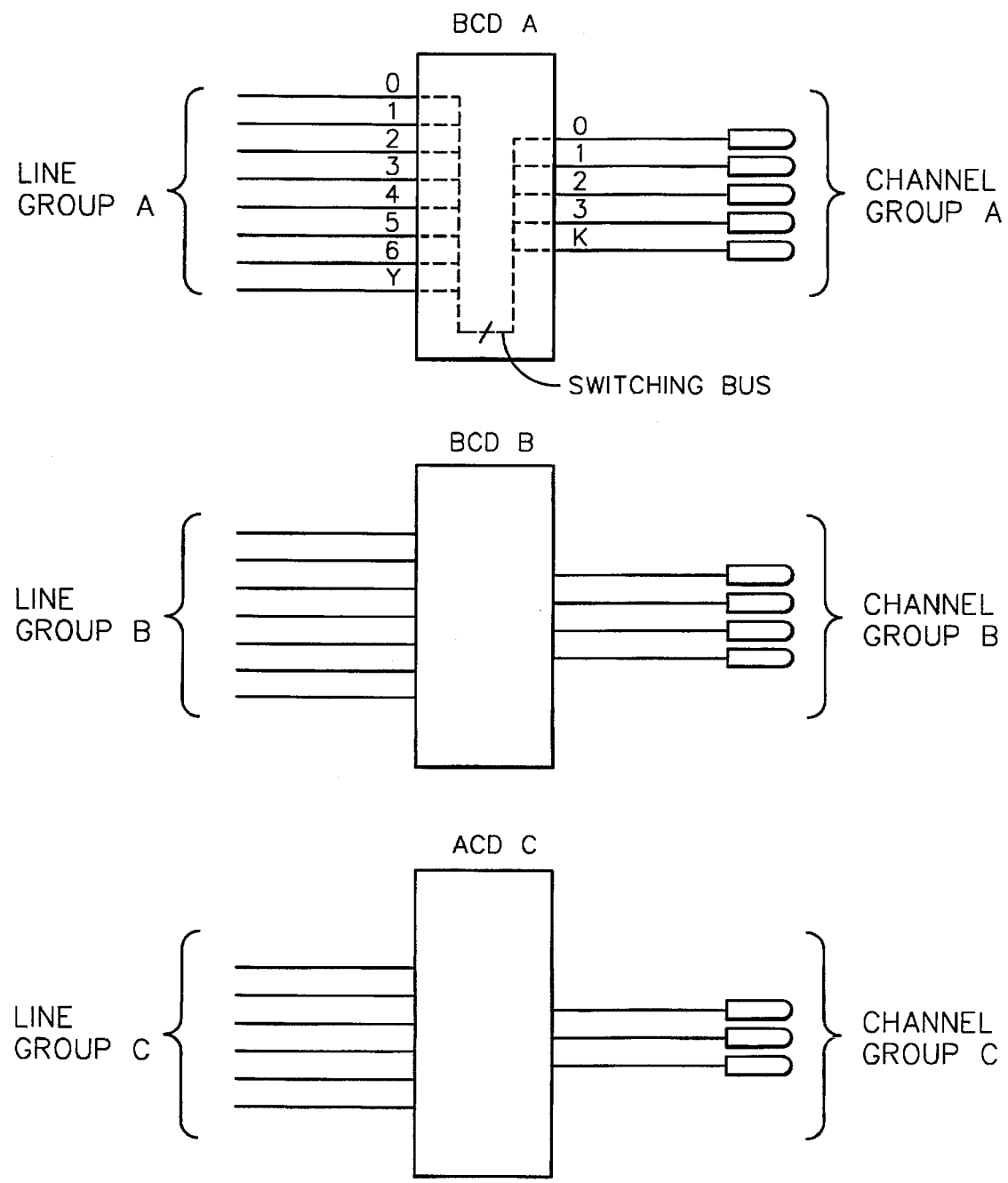
FIG. 1 depicts a prior art Automatic Call Distributor.
Figure 2:
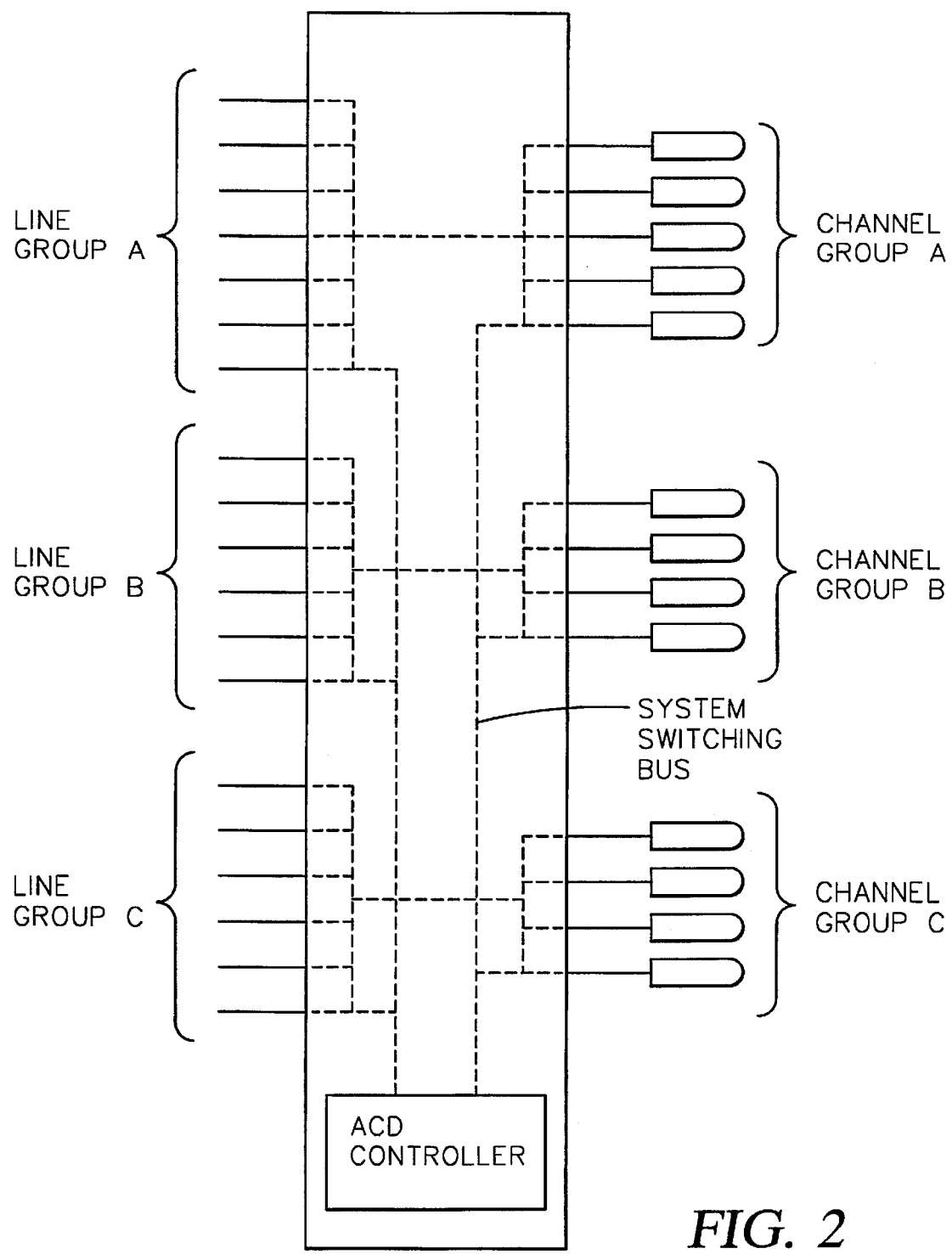
FIG. 2 depicts a prior art ACD system interconnecting a plurality of groups of lines and channels.
Figure 3:
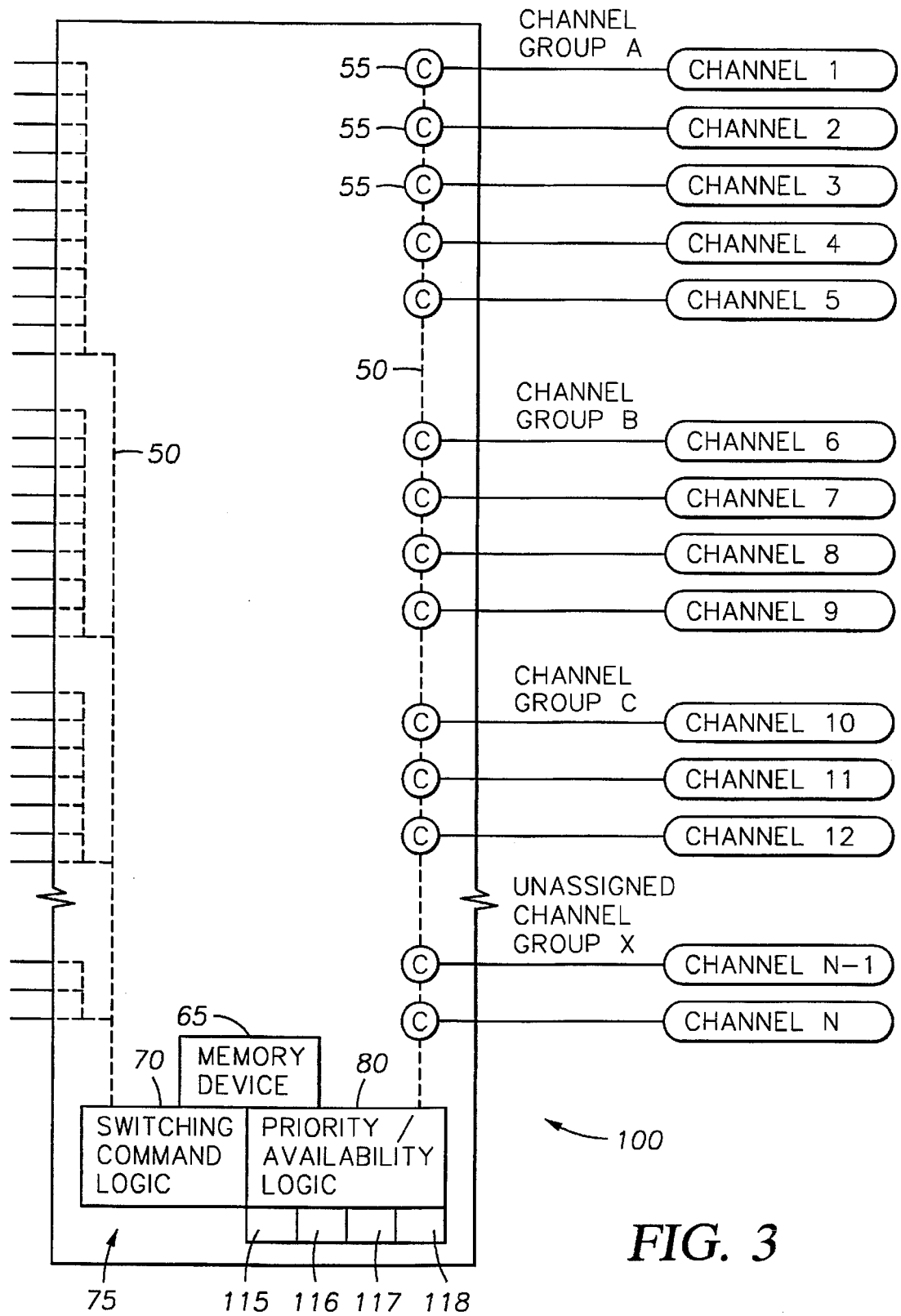
FIG. 3 shows a general schematic of an anticipatory call distributor ("ANCD") system constructed in accordance with the preferred embodiment.

Referring now to FIG. 3, the present invention constructed in accordance with the preferred embodiment generally comprises a communication distribution center for receiving and processing a plurality of simultaneous incoming telephone calls that includes an anticipatory call distributor 100 connected to a plurality of groups of telephone lines and channels. As shown generally in FIG. 3, the incoming phone lines may be classified into groups to represent telephone calls made for the same or substantially the same purpose. Thus, for example, and without limiting the use of the present invention, the phone calls made on the telephone lines ("lines") in group A may be calling to make a purchase, while group B represents phone calls made to inquire about merchandise, and Group C comprises calls made to report problems with delivery or operation of products to a customer service department. As one skilled in the art will understand, other groups also could be provided for technical support, and the like. Thus, one skilled in the art will understand that the present invention is not limited to three line groups.

Similarly, the operators or devices ("channels") in the group of channels may be classified into groups that are each assigned to a particular group of lines, so that channel group A is primarily responsible for answering and processing calls on line group A. In the preferred embodiment of FIG. 3, there is also provided an unassigned channel group X (with Channels N-1 and N) that is not assigned to any particular group, but instead is used for overflow from any of the group lines. Similarly, unassigned phone lines may also be provided.

Referring still to FIG. 3, the incoming phone lines and channels preferably are interconnected by an anticipatory call distributor 100. The anticipatory call distributor 100 constructed in accordance with the preferred embodiment generally comprises a switching bus 50 connecting the incoming telephone lines to the channels, a clock/channel status unit 55 connected to each channel, and a control and logic processor 75 connected to the switching bus 50 for controlling the switching of the lines to the channels, as will be described in more detail below.

The switching bus 50 preferably is constructed in accordance with conventional techniques to connect telephone lines to particular channels as directed by the control and logic processor 75. The switching bus 50 preferably includes a telephone line interface circuitry for each telephone line, or alternatively, the telephone line interface circuitry could be provided on the telephone lines, with the output of the interface circuitry provided as an input to the anticipatory call distributor 100. As will be understood by one skilled in the art, the functions of the line interface unit include detecting incoming telephone calls and disconnect signals, and connecting (or disconnecting) an audio or digital path from the telephone line to the switching bus. The line interface unit notifies the control and logic processor 75 that a call is waiting to be answered. The switching bus then connects the particular telephone line to a particular channel as directed by the control and logic processor 75.

The clock/channel status units 55 connect to the channels as shown in FIG. 3 and to the control and logic processor 75 via system bus 50. The clock/channel status unit 55 monitors the status of the associated channel to determine if the channel is in use, is available, is ready to receive phone calls, etc, and transmits a signal indicative of these conditions to the control and logic processor 75. In addition, the clock/channel status unit 55 preferably monitors the call length of each phone call and determines a call length for that particular channel, which also is transmitted to the control and logic processor 75. As one skilled in the art will realize, however, the determination of call length could also be performed by the control and logic processor based upon signals received from the clock/channel status unit 55 related to the status of the channel. As used in this disclosure, the term "call length" could comprise the average, the median, the mode call length, or the length of a particular portion of the calls. As one skilled in the art will realize, other alternatives also are available that represent a period of time indicative of the call duration.

The control and logic processor 75 has been configured in accordance with the preferred embodiment into two separate functional logic units. These units are shown in FIG. 3 as comprising a switching command logic 70 and a priority/availability logic 80. As one skilled in the art will understand, these logical functions could be performed by a single computer or could be performed by two or more computers. As will be understood by one skilled in the art, in this description, the term computer includes programmable logic devices such as microprocessors, microcontrollers and the like.

The switching command logic 70 preferably performs general system operations including selecting and directing the connection of channels to phone lines, and directing that a line go off hook to provide a busy signal as required. The selection of channels by the switching command logic 70 is based in part on the availability of a channel, as determined by the priority/availability logic 80.

In the preferred embodiment, the priority/availability logic 80 functions to determine current and future channel availability, to establish priorities for the incoming phone calls, and to calculate the number of channels to be reserved for each line group.

Figure 7:
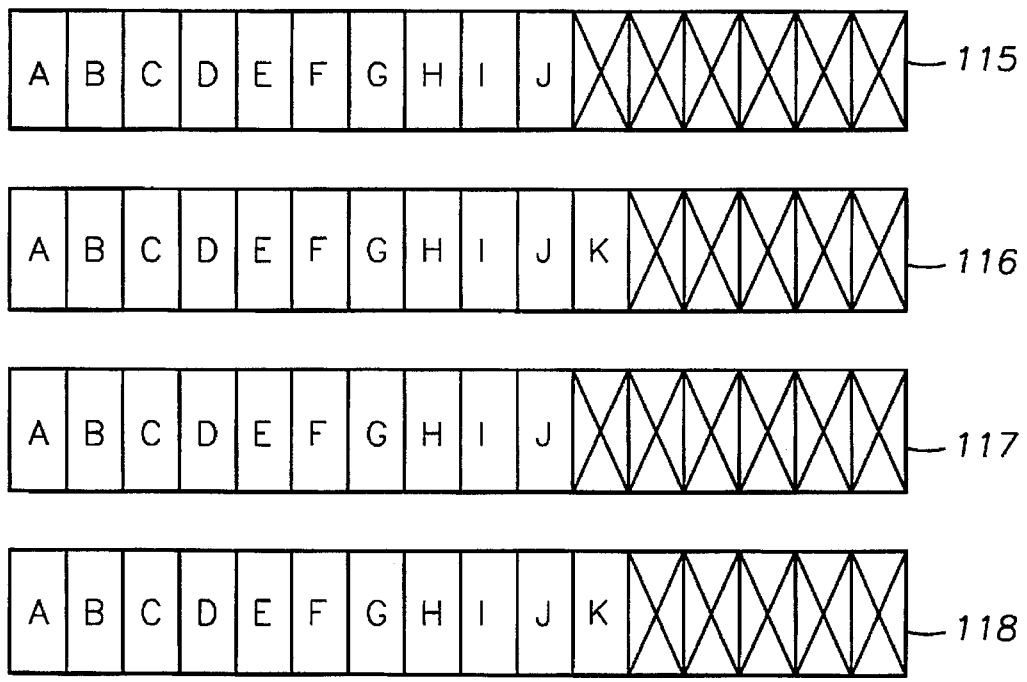
FIG. 7 illustrates status registers included as part of the priority/availability logic in the preferred embodiment of FIG. 3.

The priority/availability logic 80 preferably includes status registers 115, 116, 117 and 118 as shown in FIGS. 3 and 7, to indicate the current and future status of the channel groups. The status registers 115, 116, 117 and 118 preferably are selected to have a sufficient width to provide status information for each channel group. Preferably, a standard sixteen bit register would be used as the status registers if less than 15 line groups were implemented to provide the requisite status information.

Referring now to FIGS. 3 and 7, the control and status registers 115, 116, 117 and 118 preferably include bits dedicated to certain parameters. As will be apparent from the following discussion additional or fewer status registers may be used as required, or alternatively, the status registers may be replaced by other means, such as signals or flags or alternative subroutines directly between the logic units. For example, two status registers could be used instead of four registers by combining the functions of registers 115 and 116, and of registers 117 and 118. Four registers have been shown and described herein to facilitate an understanding of the present invention, and should not be construed as limiting the scope of the present invention.

The following discussion assumes that ten line groups and ten channel groups have been implemented in the system, which may be designated as groups A–J. Preferably, a first register 115 is provided to indicate the availability of a channel to answer a call within each channel group. Thus, for each channel group, a bit is provided in register 115. As shown in FIG. 7, register 115 includes at least ten bits, designated as bits A–J. Bits A–J indicate the availability of channels in Channel Groups A–J, respectively. If the priority/availability logic 80 determines that channels are available in channel group B, the value of bit B in register 115 is set (i.e. by setting the value in bit B to "1"). When the priority/availability logic 80 determines that no channels are available in channel group B, the value of bit B of the register 115 is cleared (i.e., the value of bit B is re-set to a value of "0"). In this manner, the switching command logic 70 can examine the appropriate bit in register 115 to determine if any channels are available in the assigned group. Register 115, therefore, may be labeled the dedicated channel availability register.

Still assuming a system with ten channel groups, register 116 preferably includes at least eleven bits, and is used to determine if there are any channels in any one of a specified channel group that is available for reassignment to other groups. In order for a channel to be available for reassignment, certain conditions must be satisfied to insure that the channel group can handle its maximum expected capacity, as described more fully below in relation to the discussion of FIG. 4G. As shown in FIG. 7, register 116 includes ten bits, designated as bits A–J, plus an eleventh bit K. Bits A–J indicate the availability of channels in Channel Groups A–J, respectively, while bit K indicates the availability of channels in the unassigned group of channels (shown in FIG. 3). If the priority/availability logic 80 determines that channels are available in channel group B for reassignment to other channels, the value of bit B in register 116 is set (i.e. by setting the value in bit B to "1"). When the priority/availability logic 80 determines that no channels are available in channel group B, the priority/availability logic 80 clears the value of bit B of the register 116 (i.e., the value of bit B is changed to a value of "0"). Register 116, therefore, comprises the available designated channel register.

If the switching command logic 70 decides that a channel needs to be reassigned, it examines the contents of register 116 to determine if any channels are available for reassignment. First, the switching command logic 70 examines the status of bit K in register 116 to determine if any unassigned channels are available. If no unassigned channels are available, the switching command logic examines the status of bits A, C–J in register 116 (for a call on Line Group B) to determine if any channels are available in these channel groups. In this manner, the switching command logic 70 examines the appropriate bits in register 116 to determine if any channels are available for reassignment.

In much the same manner as with respect to registers 115 and 116, a third and fourth register 117, 118 preferably also are provided in the priority/availability logic 80 to indicate that a channel may soon become available. The third register 117 also includes at least ten bits in a ten group system, designated as bits A–J, which indicate that channels in Channel Groups A–J, respectively, are anticipated to become available momentarily. Register 117 therefore comprises a dedicated anticipated availability register. As a result, the switching command logic 70 examines the appropriate bit in register 117 to determine if any channels are expected to become available for the associated line group.

The fourth register, register 118, is a counterpart to register 116, and is provided to enable the switching command logic 70 to reassign channels expected to become available, as long as sufficient call answering capacity remains in the appropriate channel group. Register 118 includes at least ten bits, designated as bits A–J, plus an eleventh bit K. Bits A–J indicate that channels in Channel Groups A–J, respectively, are expected to become available momentarily, while bit K indicates that channels in the unassigned group of channels are expected to become available. Register 118 can be labeled as a non-designated anticipated availability register. As a result, the switching command logic 70 examines the appropriate bit in register 118 to determine if any channels are expected to become available for reassignment.

In accordance with the preferred embodiment, the control and logic processor 100 also preferably includes a memory device 65 or registers for constructing a lookup table. An example of such a lookup table constructed in accordance with the preferred embodiment is shown in FIG. 5, to indicate the current and future status of the channels. As will be readily apparent to one skilled in the art, the memory device 65 used to implement the lookup table must have sufficient capacity to provide the necessary status information for each channel. The switching command logic checks the lookup table when an incoming phone call is detected, and uses the information provided in the lookup table in determining to which channel the call will be assigned.

Referring now to FIG. 5, the status lookup table is preferably constructed as a two dimensional array, with n rows (where n equals the number of channels in the ANCD system) and at least six columns. FIG. 5 illustrates a sample lookup table constructed in accordance with the preferred embodiment. The lookup table of FIG. 5 shows three groups with eleven channels each, but one skilled in the art will understand that the number of groups and channels may vary as required. According to the preferred embodiment, the lookup table is continuously recalculated by the control and logic processor 75.

The first column of FIG. 5 shows the channel number, while the second column shows the normal channel group designation for the particular channel. The third column represents the current channel group assignment for the current in-process call, which preferably is updated by the switching command logic whenever a channel is reassigned to a different group. The fourth column indicates the call length for the line group assigned to the channel for the current call, which preferably is determined by the priority/availability logic. The fifth column shows the maximum acceptable delay time before a ringing line is answered. In the preferred embodiment, this value is input manually during system set-up. The last column represents the calculated period of time before the channel becomes available, as preferably determined by the priority/availability logic. This value is calculated by subtracting the time that the channel has been on a call from the time/call for the group. If the time exceeds the maximum delay time, the calculated delay is left blank so that it will not be assigned. The designated channel with the lowest anticipated delay is selected by the switch command logic 70 if no channel is currently available in any channel group, as will be explained in more detail below.

Referring now to FIGS. 4A–4D, the preferred operation of the anticipatory call distributor (also referred to as "ANCD") system now will be described. In this description of system operation, the discussion will focus on the handling of a telephone call on line group B, which has been assigned a priority 2 level. It will be understood that telephone calls on other line groups are handled in the same fashion, except for priority rankings. The ANCD performs the following operation for each group in turn and then returns and repeats the cycle, unless no channels are available. The ANCD preferably begins operation by examining the group with the highest priority (which in the preferred embodiment, is assigned a value "1").

Figure 4B:
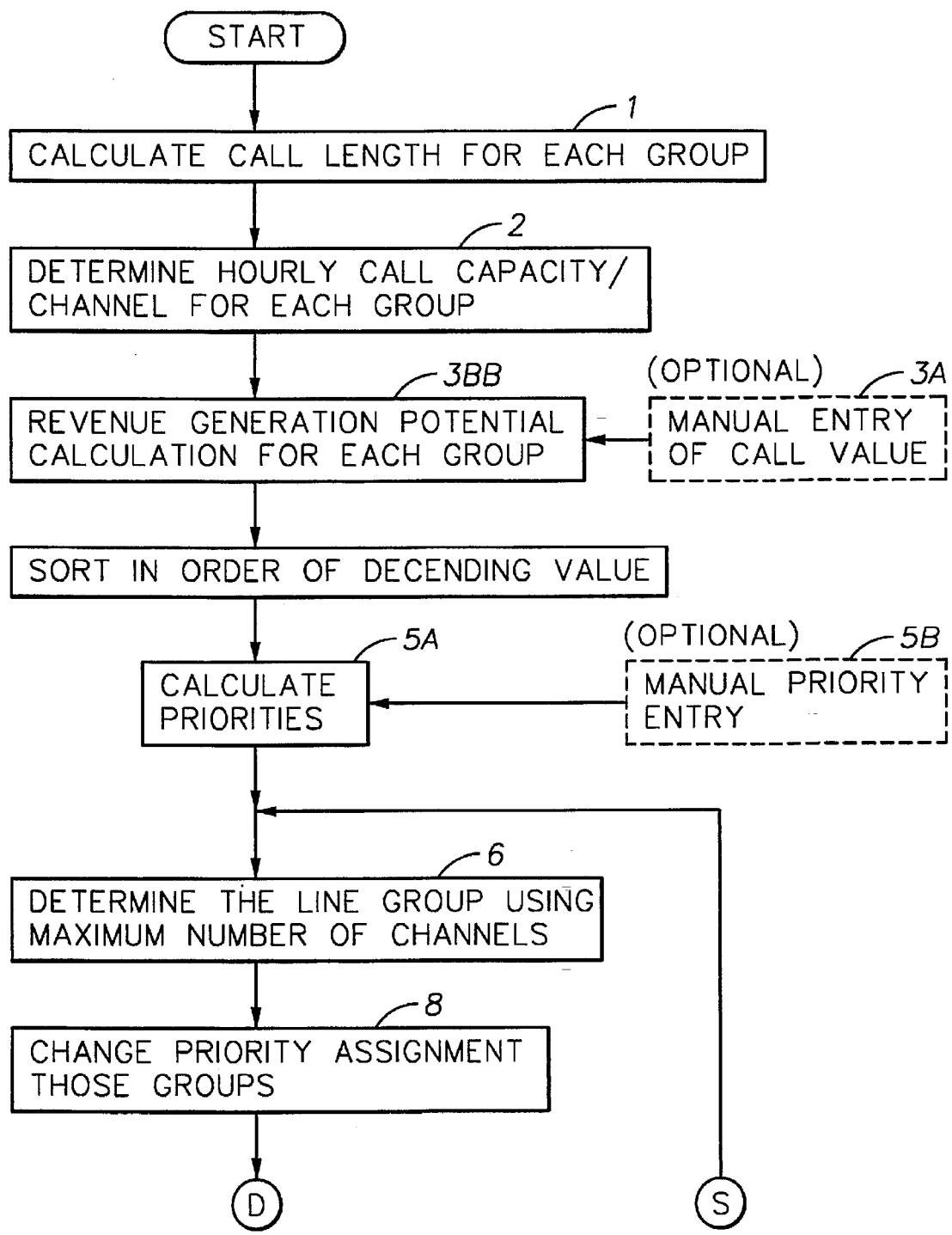
Figure 4C:
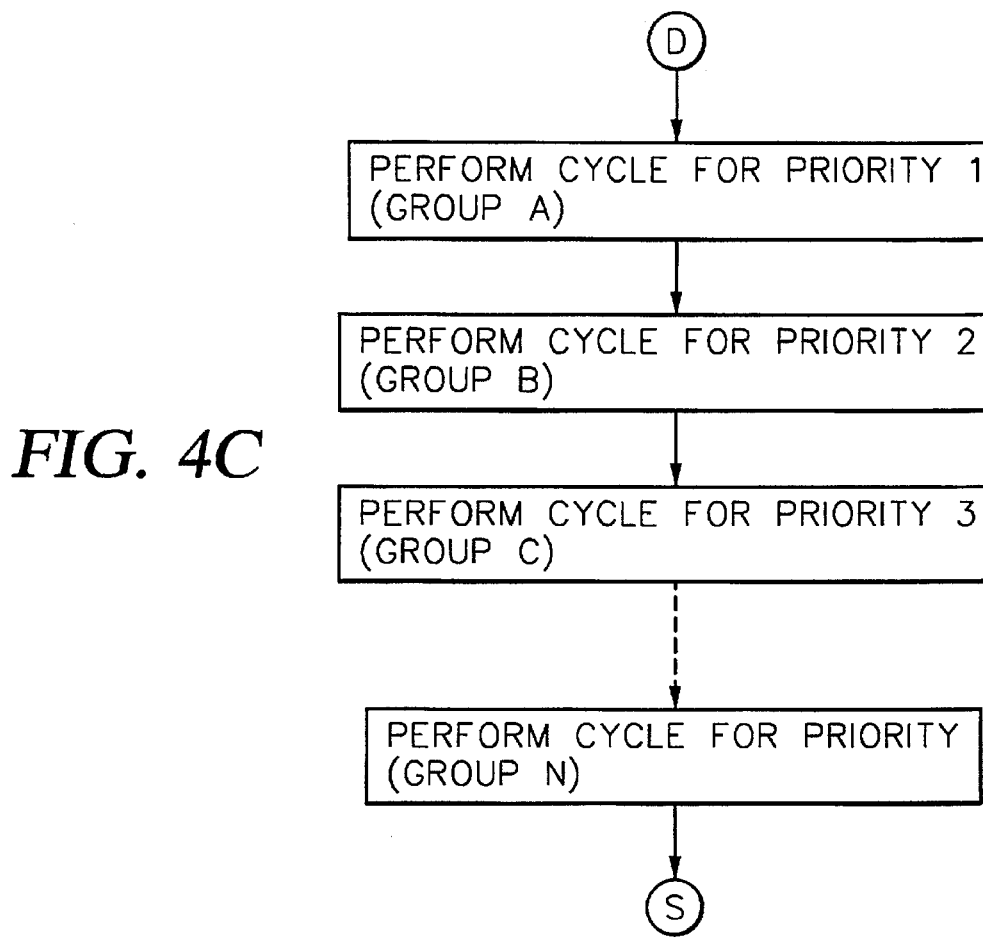

Referring initially to FIG. 4A, the overall operation of the invention is shown. As shown in more detail in FIG. 4B, the value of the incoming telephone call is evaluated and a priority is assigned. At substantially the same time, and as shown in FIGS. 4C and 4D, channel availability is anticipated in each group. Finally, the call is assigned based on priority, and connected according to the anticipated channel availability, as shown in FIG. 4D.

Referring now to FIG. 4B, the system begins operation in step 1 by having the priority/availability logic calculate the call length (preferably in seconds) for a call in each line group based upon signals preferably received from the clock/channel status units 55. The call length is calculated for each line group, and the value is stored in column four of the lookup table. The term "call length" preferably refers to a period calculated from a plurality of calls to represent a single call, based on the duration of the calls in a line group, generally from the time callers are first serviced by operators or automatic devices to the time calls are terminated. Next, in step 2, the priority/availability logic 80 preferably calculates the hourly call handling capacity for each channel, by dividing 3600 (the number of seconds in an hour) by the call length. In step 3A, the projected average dollar value of each telephone call (based upon marketing projections, historical data, or the like) preferably is entered into the system. In step 3B, the projected average value is multiplied by the hourly call handling capacity of the channel to determine a value for the revenue generation potential for the channel.

After the revenue generation potential value has been calculated for each line group, the values for each group are arranged by the priority logic 80 in decreasing order (step 4) and assigned a priority value as a function of that order (step 5A). A set of ten groups, therefore, will have priority values ranging from "1" to "10", with the line group having the highest revenue potential value per channel being assigned the highest priority except as manually designated, such as for Channel B. Thus, for example, the line group with the highest revenue generation potential value may be assigned a priority value of "1", while the line group with the second highest potential value may be assigned a priority value of "2." Alternatively, an override is available permitting priority values to be assigned manually in step 5B.

Referring still to FIG. 4B, the priority logic 80 determines in step 67 if any line groups are using an excessive number of channels (or exceeding a "maximum number of channels"), and thus potentially preventing calls from being answered from other line groups. The present invention envisions at least two methods to determine if an excessive number of channels are in use by a particular line group. The first method is to define the "maximum number of channels" available to a line group as the number of channels originally designated for that line group in the associated channel group. A second method is to define the "maximum number of channels" as a multiple of the number of designated channels in the associated channel group.

If the priority logic 80 determines (in steps 6 or 7) that any line group is using its maximum number of channels, the priority values are temporarily reassigned so that the groups that are using all of the channels to which they are allocated (including pre-assigned and overflow channels), are given a priority value that is lower than the priority value of line groups that have not reached their maximum allocation of channels. Thus, for example, if the system includes ten groups, identified as Groups A–J, with a priority order of A, B, C, D, E, F, G, H, I, J, and groups A, D and E have reached their maximum allocation of channels, the priority logic 80 in step 8 reassigns the priority order as B, C, F, G, H, I, J, A, D, E.

Referring now to FIG. 4C, after priority values are assigned for the groups by the priority logic 80, the switching command logic 70 then cycles through each line group in turn, in the order of the assigned priority values, to determine if a new telephone call has appeared that has not been answered. The switching command logic 70 determines if a call has appeared by monitoring the presence of an incoming call signal being recognized by the line interface unit. If a call has appeared on a line group, the switch command logic 70 branches to the routine of FIG. 4C to determine which channel shall be assigned to answer the phone call. If no call has appeared, the switch command logic 70, after performing a similar sequence for each of the line groups (see FIG. 4B), loops to step 67 in FIG. 4B. The following discussion will assume that a telephone call has been detected on line group B.

Referring now to FIG. 4D, the routine for determining which channel will answer the call will now be discussed. Initially, when a call is received in a group (step 10), the switching command logic 70 looks for an available channel in the designated channel group in step 12. To determine whether or not a channel is available within the assigned channel group, the switching logic 70 preferably checks the value of particular status information, such as a flag or bit in register 115 (of FIG. 7), which is activated by the routine of FIG. 4E by priority/availability logic 80. If no call is incoming on that line group, then the logic 70 advances to look at the next line group, as shown in steps 10A and 10B.

If a phone call comes in on line group B, the switch command logic 70 in step 12 looks for an available channel in channel group B by checking the appropriate status information (in the preferred embodiment, a bit or flag in location bit B in register 115). If the status bit indicates that a channel is available in Channel Group B, the switching command logic 70 proceeds to step 19 of FIG. 4C. If no channel is available in the assigned channel group, the switching command logic 70 determines whether any channels are available in the unassigned channel group (step 13) by checking the status of bit K in register 116. If bit K indicates that an unassigned channel is available, the switching command logic 70 proceeds to step 19 of FIG. 4D. If no unassigned channel is available, the switching command logic 70 proceeds to step 14.

In step 14, the switching logic preferably checks the status of the other bits in register 116 (bits A, C–J if the call came in on line group B) to determine if a channel designated for another group is available. If so, then switching command logic 70 proceeds to step 19.

If the switching command logic determines that no channels are available in any channel group (i.e., the status of all bits in register 116 have a value indicating unavailability), then the switching command logic proceeds to step 15. In step 15, the switching logic determines whether a channel in the associated channel group is expected to become available before the expiration of the maximum allowable answer delay (the "On hold period"). The term "On hold" relates to the process of delaying the servicing of a call. The On hold period is generally the time that a caller can be expected to wait on hold based on a subjective manual determination or the time other callers waited before hanging up or becoming annoyed. As one skilled in the art will immediately realize, this period can be derived in a myriad of ways, including preliminary testing, using historical data, or the like. In the preferred embodiment, the maximum allowable delay is entered manually during system setup in column five of the lookup table. During the time that the caller is waiting to be serviced, various methods can be used to delay service to a caller while minimizing caller annoyance until the call can be serviced. These methods include (a) answering and playing music; (b) ring without answering (variable answer delay); (c) answer, give a message, and then silence; (d) answer, give a message, silence, second message, silence, and so on; (e) answer, give a promotional or service announcement; and (f) answer, followed by interactive question and answer sessions using an automated device. The total call duration includes the time that the caller was placed on hold (the delay period) and the call processing time (call length period).

In accordance with the preferred embodiment, each clock/channel status unit 55 monitors the status of each answered call within the associated channel, and determines the duration of each call. The duration of each call (or "elapsed time" or "ET") preferably is compared with an average call length for calls in that channel (which can be derived from preliminary testing or historical data) to determine the expected time remaining before that call terminates, and the channel becomes available (also referred to herein as the "time available" or "TA" period). The priority/availability logic preferably compares the TA period with the On hold period to determine if a channel is expected to become available before the maximum allowable On hold period. If the TA period is less than the On hold period, the priority/availability logic 80 sets the appropriate bit in registers 117 and 118, to indicate to the switching command logic 70 that a channel in that channel group is expected to become available within the On hold period window. In addition, if the TA period is less than the On hold period, the TA period is entered in column six of the lookup table for that channel. If the TA period is greater than the On hold period, column six is left blank for that particular channel. Thus, for example, if the priority/availability logic 80 for channel B determines that the expected time remaining (TA period) on a call for any one channel in Channel Group B is less than the On hold period, the priority/availability logic sets status bit B in registers 117, 118 to indicate a channel is expected to become available (by, for example, setting the value of bit B in registers 117 and 118 to a value of "1") and enters the TA period in column six for that channel.

In step 15, the switching command logic checks the status of the designated channel to determine if a channel is expected to become available in that channel group. This is done, in accordance with the preferred embodiment, by checking the status of the appropriate bit in the status and control register 117. Thus, for a call on Line Group B, for which there is no immediately available channel, the switching command logic 70 checks the status of bit B in register 117 to determine if a channel is expected to become available within the On hold period window. If so, the switching command logic proceeds to step 19.

If status bit B in register 117 indicates that no channel is expected to become available in Channel Group B, the switching command logic 70 next checks the status of bit K in register 118 (step 16) to determine if a channel is expected to become available in the unassigned channel group. If a channel is expected to become available in the unassigned channel, the switching command logic 70 proceeds to step 19.

If status bit K is negative, the switching command logic 70 checks the status of the bits in the non-designated channels (channels A, C–J for a call on Line Group B) of register 118 in step 17 to determine if any non-designated channels are expected to become available in any of those channel groups. If so, the switching logic 70 proceeds to step 19. If all of the bits in register 118 are negative, the switching command logic proceeds to step 18, and in step 18, notifies the appropriate line interface units on other unused lines in the line group to go off hook, thereby causing these lines to be busied out. If channels are available to handle some of the incoming calls, but not all, the switching command logic in step 18 examines the priority of the incoming calls and assigns the incoming calls with the highest priority to available channels, or to channels expected to become available, and causes the line interface units to go off hook on other lines.

Referring still to FIG. 4D, once a channel has been found to be available, or has been found to be expected to become available within a predetermined time period, that channel is assigned by the switching command logic in step 19 to the channel group associated with the line group that has a phone call, and the lookup table is updated to reflect this assignment. If no channel is available, but several channels are expected to become available prior to the expiration of the On hold period, the switching command logic selects the channel with the shortest expected delay, which is derived by comparing the values in column six for the channels. Thus, if a phone call appears on Line Group B, the channel that has been determined to be available, or which will become available, based upon the routine of FIG. 4D, will be assigned to Channel Group B. In step 20 the switching command logic notifies the automated telephone answering machine that the call is to be handled in accordance with the procedures of that channel group. For example, if a call comes in on Line Group B, the automated device or operator is informed to answer according to a Channel Group B format. Similarly, if the call is to be answered live by an operator, the switching command logic preferably notifies the operator or other distributing equipment that the call relates to Channel Group B to more efficiently handle the incoming call.

The subroutine is completed in step 21 by connecting the selected channel to the line that needs to be answered, and the system advances to step 11A–11N in FIG. 4C, to complete the cycle through all groups.

Figure 4E:
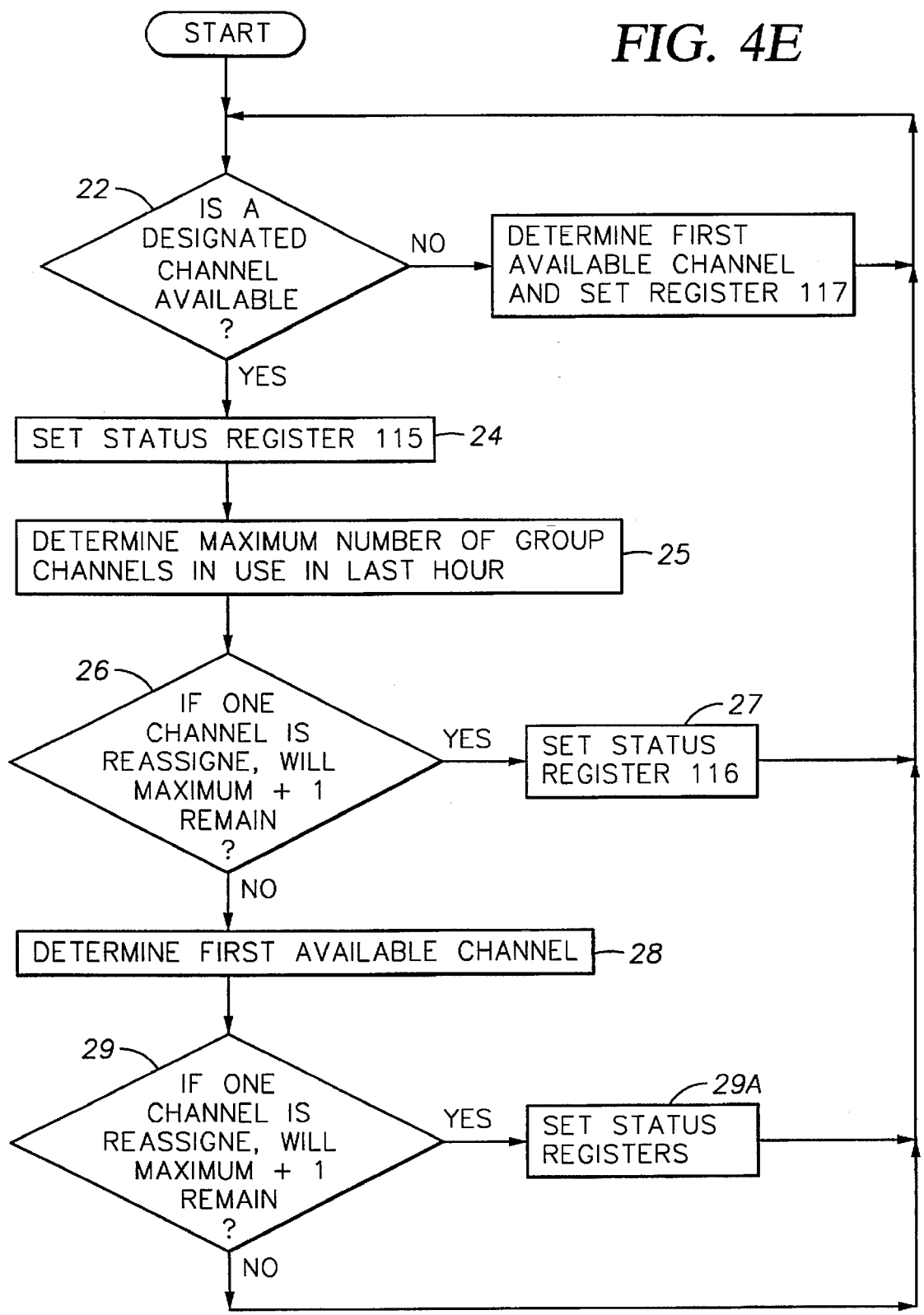

Referring still to FIGS. 4E and 4F, the preferred method of determining channel availability will now be discussed. The following discussion relates particularly to operation for channel Group B, but similar operation occurs for each of the other groups. Moreover, this subroutine of FIGS. 4E and 4F is continuous and continues to run as long as the ANCD is operational.

When the ANCD is turned on, the priority/availability logic 80 preferably clears all status registers before beginning operation. The priority/availability logic then makes a determination in step 22 as to whether any channel designated for that group is not in use and is available. If no channels are available, reference is made to the lookup table of FIG. 5 to determine which channel will become available first, and whether that channel will become available within the On hold time period. If a channel is expected to become available within that period, in step 23 the channel that is expected to become available first is selected and the appropriate bit in register 117 is set to indicate to the switching command logic that a channel has been selected that is expected to become available in that channel group.

If a channel is available and not in use, that channel is selected for assignment to that channel group and in step 24 the appropriate bit in register 115 is set to indicate to the switching command logic that an available channel exists in that channel group.

In step 25, a determination is made of the maximum number of channels in use at any one time within the past hour. In step 26, the priority/availability logic determines whether a designated channel will be made available for reassignment to other groups based upon a determination of whether enough channels exist to handle the maximum capacity experienced in the past hour (which was found in step 25), plus one. Thus, if a group had ten channels and six were used in the last hour, three channels would be available for reassignment (10−(6+1)=3). If channels are available for reassignment, as determined in step 26, the appropriate status bit in register 116 is set in step 27 to indicate that channels are available in that channel group for reassignment.

If no channels are available for reassignment, the priority/availability logic 80 selects the first channel that is expected to become available in step 28, based upon reviewing column six of the lookup table. In step 29, the priority/availability logic determines whether, if that channel is targeted for reassignment, there would remain available for the designated group the maximum number of channels in use in the last hour (determined by step 25), plus one. If enough channels would remain, the channel is selected for reassignment in step 29A and the appropriate bit in registers 117 and 118 are set to indicate that a channel will become available within the On hold period in that channel group that is available for use by the associated line group, or for reassignment to a different group.

Referring still to FIG. 4F the operation of the priority/availability logic relating to the unassigned group will be described. The priority/availability logic determines in step 30 whether there are any channels in the unassigned group not in use. If an unassigned channel is available, that channel is selected for the next assignment by the priority/availability logic, and bit K of register 116 is set to indicate an unassigned channel is currently available for assignment, as shown in step 31. If no channels are currently available for assignment, the priority/availability logic selects the first channel that is expected to become available within the On hold period based upon a review of column six of the lookup table, and bit K of register 118 is set as shown in steps 32A and 32B.

Figure 6:
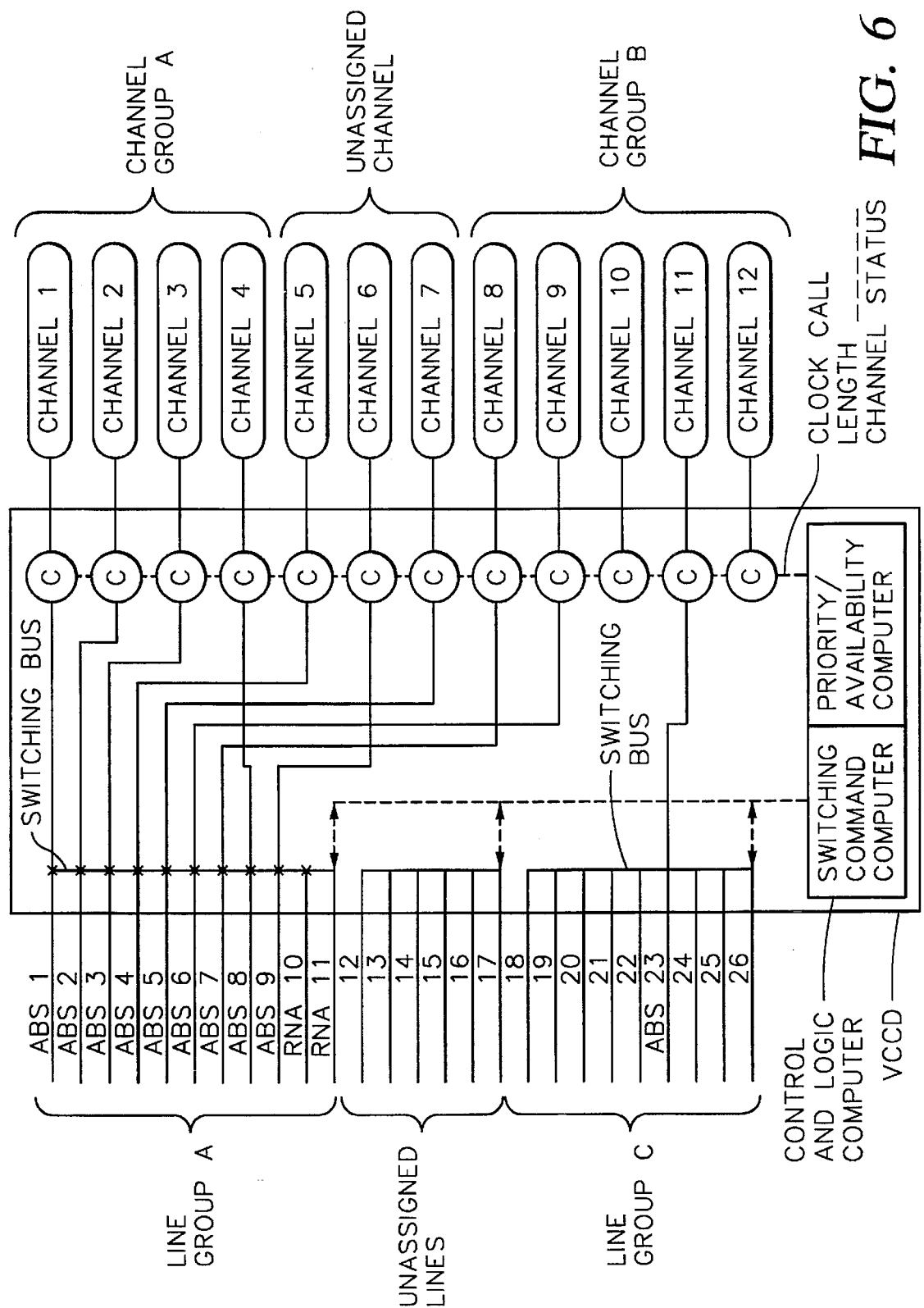
FIG. 6 depicts a schematic of the anticipatory call distributor of FIG. 3 illustrating the operation of the call distributor at one moment in time.

Referring now to FIG. 6, a drawing of a two channel ANCD is shown which illustrates the operation of the ANCD at one instant in time. FIG. 6 shows eleven lines for line group A and nine lines for line group B. At the particular instant in time shown in FIG. 6, ten calls have been received in line group A and one call in line group B. Nine of the group A callers have been connected (as indicated by the notation ANS, for "answered")—four to channel group A (channels 1, 2, 3 and 4), three to the unassigned channel group (channels 5, 6 and 7), and two to channel group B (channels 8 and 9). The call on line group B has been connected to channel 11 in channel group B.

Based upon the computations by the control and logic processor 75, group B requires a minimum of three channels to be dedicated to it. As a result, the caller on Group A line 10 would not be connected to an answering channel. Instead, it would be given a Ring No Answer (RNA), be placed on an announcement hold, switched elsewhere, or given a busy signal.

While a preferred embodiment of the invention has been shown and described, modifications thereof can be made by one skilled in the art without departing from the spirit of the invention. For example, the principles of the present invention could be implemented in a system where all channels are unassigned. The present invention is not limited to use with incoming telephone lines; it can be used with a voice mail system, an audiotex system, or other automated answering systems. Nor is it necessary that the channel groups be located near the ANCD. The ANCD could be used to distribute calls to remote locations, including remote call centers or to individuals working at their residence. In addition, the present invention does not require a fixed number of lines or channels. The number of lines or channels may vary, for example, when live operators are absent from work stations.

Moreover, the preferred embodiment of the present invention links a particular line to a particular channel in anticipation of the channel becoming available in the immediate future. It should be understood, however, that the line need not be immediately assigned to a particular channel. Instead, the line may be placed in a queue, based upon the expectation that a channel will become available before the expiration of the On hold period. Once placed in the queue, however, the line would be connected to the first available channel based upon the time that the line has been placed in queue.

These and many other variations and modifications of the present invention are possible without departing from the scope and spirit of this invention.

I claim:

1. A method for distributing calls on a plurality of lines to a plurality of channels, comprising the steps of:
   (a) determining channel availability and assigning available channels to answer calls;
   (b) to the extent that any calls remain unassigned after step (a), monitoring at least one parameter indicating future channel availability to anticipate the time until a channel will become available to answer calls; and
   (c) assigning channels to answer calls based upon the time anticipated in step (b).

2. A method as in claim 1, further including the step of connecting a line to a particular channel within the plurality of channels.

3. A method for distributing calls on a plurality of lines to a plurality of channels, comprising the steps of:
   (a) determining channel availability and assigning available channels to answer calls, including:
      (1) determining which line group the call came in on;
      (2) determining if a channel is available in a designated channel group and assigning such available designated channel to answer the call; and
      (3) in response to a negative determination in step (a)(2), determining if any channel is available in a non-designated group and assigning any such available non-designated channel to answer the call;
   (b) to the extent that any calls remain unassigned after step (a), anticipating the time until a channel will become available to answer the call; and
   (c) assigning said channel to answer the call based upon the time anticipated in step (b).

4. A method as in claim 3, wherein, in response to a negative determination in step (a)(2), in lieu of step a(3), determining if any channel is available from an unassigned channel group and assigning any such available unassigned channel to answer the call.

5. A method as in claim 3, wherein step (a)(3) includes determining if a minimum quantity of channels remains from the non-designated group to handle the calls by the line group assigned to the non-designated channel group, plus a number of reserve channels determined to be sufficient to service calls arriving on the lines assigned to the non-designated group before assigning the non-designated channel to answer the call.

6. A method as in claim 3, wherein a status register is set in response to an affirmative determination in step (a)(2).

7. A method as in claim 3, wherein a status register is set in response to an affirmative determination in step (a)(3).

8. A method as in claim 3, further including the step of connecting a line to a particular channel within the plurality of channels.

9. A method for distributing calls on a plurality of lines to a plurality of channels, comprising the steps of:
   (a) determining channel availability and assigning available channels to answer calls;
   (b) to the extent that any calls remain unassigned after step (a), anticipating the time until at least one channel will become available to answer calls, including:
      (1) determining a time period indicative of the call length for a particular line group;
      (2) measuring the duration of an existing call; and
      (3) subtracting the measured duration (step b(2)) from the time period for a call in that line group (step b(1)) to determine a predicted time until channel availability for said at least one channel; and
   (c) assigning channels to answer calls based upon the time predicted in step (b)(3).

10. A method as in claim 9, further comprising the steps of:
    (b)(4) determining a maximum allowable period for which a caller will wait to be serviced;
    (b)(5) comparing the time until availability (step b(3)) with the maximum allowable on hold period (step b(4)); and
    (b)(6) indicating that the channel will become available if the time until availability is less than the maximum allowable on hold period.

11. A method as in claim 9, wherein the step of determining the time period for a call in a particular line group (step b(1)) is based upon historical data.

12. The method as in claim 9, wherein said step of determining said time period includes the step of measuring the time period from the time said call is first serviced by said channel to the time said call is terminated.

13. The method as in claim 9, wherein said step of measuring the duration of an existing call includes the step of measuring the time period from the time said call is first serviced by said channel to the current time.

14. The method as in claim 13, wherein said step of assigning channels includes the step of assigning channel groups to answer calls.

15. A method for distributing calls on a plurality of lines to a plurality of channel groups including channels, comprising the steps of:
    (a) determining channel availability and assigning available channels to answer calls;
    (b) to the extent that any calls remain unassigned after step (a), anticipating the time until at least one channel will become available to answer calls; and
    (c) assigning at least one channel group to answer calls based upon the time anticipated in step (b), including:
       (1) determining which line group the call came in on;
       (2) determining if a channel will become available in the designated channel group and assigning the designated channel group to answer the call;
       (3) in response to a negative determination in step (c)(2), determining if any channel will become available in an unassigned channel group and assigning any such unassigned channel group to answer the call; and (4) in response to a negative determination in step (c)(3), determining if any channel in an assigned non-designated channel group will become available and assigning such channel group to answer the call.

16. A method as claimed in claim 15, wherein the channel that will become first available, regardless of the determinations in steps (c)(1), (c)(2), (c)(3), or (c)(4) is selectively assigned.

17. A method of assigning incoming calls on one of a plurality of line groups to a non-designated channel group among a plurality of channel groups, comprising the steps of;
   (a) assigning a priority value to the line group;
   (b) assigning calls from the line group to a non-designated channel group based on said priority value of the line group;
   (c) modifying said priority value of the line group based upon the volume of calls already being answered; and
   (d) assigning calls from the line group to one or more non-designated channel groups based on said modified priority value of the line group.

18. A method as in claim 17, wherein the step of modifying the priority value (step b) includes the steps of;
   (b)(1) determining if a line group is using a designated quantity of channels; and
   (b)(2) modifying the priority value of any line group exceeding the quantity of channels determined in step (b)(1).

19. A method as in claim 18, wherein step (b)(2) comprises assigning the line group determined in step (b)(1) a priority value that is lower than line groups not using the designated quantity of channels for the channel group.

20. A method as in claim 17, wherein the step of modifying the priority value (step b) includes the steps of:
   (b)(1) determining if a line group is using a multiple of the number of channels provided in the channel group designated for the line group; and
   (b)(2) to any line group which is using a multiple of the number of channels provided in the designated channel group, assigning a priority value that is lower than all other line groups not using the multiple of channels in the designated channel group.

21. A method as in claim 17, wherein the priority value is based on a projected value of a telephone call.

22. A method as in claim 17, wherein said step of modifying said priority value is carried out either automatically or manually.

23. A method as in claim 17, wherein said step of assigning a priority value to the line group includes assigning a priority value to one line group of at least three line groups.

24. A system for automatically connecting a call from a telephone line in a designated one of a plurality of telephone line groups to one channel in one of a plurality of channel groups, comprising:
   a switching bus connecting one telephone line to the one channel;
   a clock and channel status unit connected to said plurality of channel groups for providing a signal indicative of the duration of a connected call;
   priority and availability logic for receiving said signals from said clock and channel status units and for determining the period of time until the channel becomes available;
   wherein said priority and availability logic also updates the period of time until the channel becomes available by determining the duration of a connected call, and subtracting this duration from the call length for the designated line group; and
   switching command logic for controlling said switching bus to selectively interconnect said line with a channel based upon the calculated time until a channel will become available when not presently available as determined by said priority and availability logic.

25. A system as in claim 24, wherein said priority and availability logic determines the present availability of said channels, when a channel is presently available.

26. A system as in claim 24, wherein said priority and availability logic and said switching command logic form part of a control and logic processor.

27. A system as in claim 26, wherein said control and logic processor also includes a memory for storing lookup tables.

28. A system as in claim 27, wherein a lookup table is continuously updated by the priority and availability logic and the switching command logic.

29. A system as in claim 28, wherein the lookup table comprises a two dimensional array providing operating parameters for each channel.

30. A system as in claim 29, wherein the operating parameters include group designation and current group assignment.

31. A system as in claim 30, wherein the operating parameters also include at least two parameters from the line group comprising call length, maximum acceptable delay, and time until a channel becomes available.

32. A system as in claim 24, wherein the switching command logic checks the status registered when determining which channel to connect to an incoming call.

33. A system as claim 24, wherein the number of channels in a group varies.

34. A system as in claim 24, wherein at least one of the channel groups is served by an operator.

35. An automated call distributing system, comprising:
   a plurality of lines configured into a plurality of line groups for receiving incoming calls;
   a plurality of channels configured into a plurality of channel groups for answering said incoming calls, wherein each line group has a designated channel group for answering incoming calls on the associated line group;
   an automatic call distributor unit for selectively connecting the lines to the channels, said automatic call distributor including a control and logic processor for monitoring channel availability and selecting available channels to handle incoming calls on the lines;
   wherein said automatic call distributor reserves a minimum quantity of available channels in each channel group for answering only calls on the associated line group; and
   wherein said minimum quantity of available channels is dynamically variable and dependent on call load.

36. A system as in claim 35, wherein said control and logic processor also determines anticipated channel availability and selects anticipated available channel groups to handle incoming calls when a channel is not available.

37. A system as in claim 36, wherein said plurality of channel groups include an unassigned channel groups for handling overflow calls routed by said control and logic processor.

38. A system as in claim 35, wherein at least one channel group includes an automated device for responding to communication signals.

39. A system as in claim 35 wherein, when there are an insufficient number of channels to handle all incoming calls from a plurality of line groups, priorities are assigned to at least two line groups to allocate available channels in a plurality of channel groups.

40. A system as in claim 39 wherein the allocation of channels to a line group is based on the call handling capacity of one or more channels assigned to said line group.

41. A system as in claim 39 wherein the priorities are based on a projected value of a telephone call.

42. A system as in claim 35, wherein the system includes one or more channels for at least two designated channel groups, wherein each channel group processes a plurality of calls made for substantially the same purpose.

43. A system as in claim 42, wherein the process is altered in response to reassigning a channel to a different line group.

44. A system as in claim 35, wherein the channels in each designated group are programmed with a different announcement.

45. A system as in claim 44, wherein the announcement is altered in response to reassignment of a channel to a different line group.

46. A system as in claim 35, wherein one or more incoming calls are served by one or more of: an automated telephone announcement device, and answering device, a recording device.

47. A method for controlling the assignment of a plurality of lines to a plurality of channel groups, comprising the steps of:

determining the availability of at least some of the plurality of channel groups for assigning available channel groups to the plurality of lines;

monitoring at least one parameter indicating future channel group availability to anticipate one or more channel groups becoming available; and assigning at least some of the plurality of channel groups to one or more lines based upon said future channel group availability.

48. A method as in claim 47, further including the step of handling a plurality of incoming lines by switching said incoming lines to said at least some of the plurality of channel groups based upon said step of assigning.

49. A method according to claim 48, further including the step of assigning a priority value to at least some of the plurality of lines.

50. A method according to claim 49, wherein the plurality of lines transmit one or more calls; and wherein said step of assigning said priority value includes the step of weighting the value of at least some of said one or more calls.

51. A method according to claim 49 further including the step of reassigning said priority value at least once.

52. A device for controlling the assignment of a plurality of lines to a plurality of channel groups, comprising:

a unit for determining availability of at least some of the plurality of channel groups for assigning available channel groups to the plurality of lines;

a monitor for monitoring at least one parameter indicative of future channel group availability and for anticipating one or more channels groups becoming available; and a logic unit for assigning the one or more lines to one or more channel groups based upon said future channel group availability.

53. A device as in claim 52, further including a call distributor for switching said incoming lines to the one or more channel groups based upon the availability of the one or more channel groups.

54. A device as in claim 52, further including a call distributor for connecting a line to a particular channel within a channel group.

55. A device as in claim 52, further including a switching bus; and a control logic processor; and wherein said logic processor includes a switching command logic and a priority logic for selecting and directing the assignment of the plurality of lines to the plurality of channel groups.

56. A device as in claim 55, wherein said priority logic determines current and future availability of the channel groups to establish priorities for the plurality of lines and to determine the number of channels to be reserved for the plurality of lines.

57. A device for controlling the assignment of a plurality of lines to a plurality of channels, comprising:

a unit for determining channel availability of at least some of the plurality of channels for assigning available channels to the plurality of lines;

a monitor for monitoring at least one parameter indicative of future channel group availability and for anticipating one or more channels becoming available; and a logic unit for assigning the one or more lines to one or more channels based upon said future channel availability.

58. A method for controlling the assignment of a plurality of lines to a plurality of channels, comprising the steps of:

determining the availability of at least some of the plurality of channels for assigning available channels to at least some of the plurality of lines;

monitoring at least one parameter indicating future channel availability to anticipate one or more channels becoming available; and assigning at least some of the plurality of channels to one or more lines based upon said future channel availability.

59. A method for distributing calls on a plurality of lines to a plurality of channels, comprising the steps of:

(a) determining channel availability and assigning available channels to answer calls;

(b) to the extent that any calls remain unassigned after step (a), anticipating the time until at least one channel will become available to answer calls, including:

(1) determining a parameter indicative of a call duration;

(2) determining a parameter indicative of the status of an existing call; and (3) comparing said parameters determined in steps (b)(1) and (b)(2) to determine channel availability for said at least one channel; and (c) assigning said at least one channel to answer calls based upon the determination in step (b)(3).

* * * * *